(12) United States Patent
Brenner et al.

(10) Patent No.: US 8,163,843 B2
(45) Date of Patent: Apr. 24, 2012

(54) CRYSTALLINE COPOLYMERS HAVING HIGH SOLUBILITY IN NON-HALOGENATED SOLVENTS, AND THEIR USE

(75) Inventors: Gabriele Brenner, Duelmen (DE); Rene Koschabek, Mannheim (DE); Georg Becker, Witten (DE)

(73) Assignee: Evonik Degussa GmbH, Essen (DE)

( * ) Notice: Subject to any disclaimer, the term of this patent is extended or adjusted under 35 U.S.C. 154(b) by 288 days.

(21) Appl. No.: 12/523,069

(22) PCT Filed: Jan. 8, 2008

(86) PCT No.: PCT/EP2008/050119
§ 371 (c)(1),
(2), (4) Date: Jul. 14, 2008

(87) PCT Pub. No.: WO2008/090015
PCT Pub. Date: Jul. 31, 2008

(65) Prior Publication Data
US 2010/0016543 A1    Jan. 21, 2010

(30) Foreign Application Priority Data
Jan. 26, 2007   (DE) .................. 10 2007 004 102

(51) Int. Cl.
*C08G 63/48* (2006.01)
(52) U.S. Cl. ......... 525/7; 528/271; 528/272; 528/295.3; 528/302; 528/305; 528/308.6; 525/440.15; 427/207.1; 156/60; 156/241; 252/88.2; 252/299.01
(58) Field of Classification Search .................. 528/271, 528/272, 295.5, 296, 300, 302, 303, 304, 528/305, 306, 308, 308.1, 308.3, 308.6, 308.7, 528/308.8; 427/207.1, 208.8, 220, 221, 222; 525/7, 10, 440.15; 156/60, 241, 242, 244.12, 156/244.24; 252/88.2, 299.01
See application file for complete search history.

(56) References Cited

U.S. PATENT DOCUMENTS

| | | | |
|---|---|---|---|
| 3,329,740 A | 7/1967 | Battersby | |
| 3,436,301 A | 4/1969 | Mchale | |
| 3,954,689 A | 5/1976 | Hoeschele | |
| 4,166,895 A | 9/1979 | Buxbaum et al. | |
| 5,340,873 A | 8/1994 | Mitry | |
| 5,869,594 A * | 2/1999 | Kinkelin et al. | 528/300 |
| 2003/0176567 A1* | 9/2003 | Tallmadge | 524/589 |
| 2005/0014012 A1* | 1/2005 | Stapperfenne et al. | 428/480 |
| 2005/0090594 A1* | 4/2005 | Nguyen | 524/394 |

FOREIGN PATENT DOCUMENTS

| | | |
|---|---|---|
| EP | 0 530 626 | 3/1993 |
| GB | 1 489 208 | 10/1977 |
| JP | 62 39680 | 2/1987 |
| JP | 6 184515 | 7/1994 |
| JP | 2002 47471 | 2/2002 |
| JP | 2003 13032 | 1/2003 |
| JP | 2003 327676 | 11/2003 |

OTHER PUBLICATIONS

U.S. Appl. No. 12/520,999, filed Jun. 24, 2009, Koschabek, et al.
U.S. Appl. No. 12/595,046, filed Oct. 8, 2009, Brenner, et al.
U.S. Appl. No. 12/673,289, filed Feb. 12, 2010, Koschabek, et al.

* cited by examiner

*Primary Examiner* — James J Seidleck
*Assistant Examiner* — Frances Tischler
(74) *Attorney, Agent, or Firm* — Oblon, Spivak, McClelland, Maier & Neustadt, L.L.P.

(57) ABSTRACT

A description is given of the preparation of high molecular mass, crystalline copolyesters with high solubility in non-halogenated and non-aromatic solvents, and of their use in adhesives.

18 Claims, No Drawings

CRYSTALLINE COPOLYMERS HAVING HIGH SOLUBILITY IN NON-HALOGENATED SOLVENTS, AND THEIR USE

The present invention relates to the preparation of high molecular mass, crystalline copolyesters having high solubility in non-halogenated and non-aromatic solvents and to their use in adhesives.

Copolyester-based adhesives find diverse use in the adhesives industry on account of factors which include their broad adhesion spectrum and their good mechanical properties. Although application is increasingly from the melt, there is still a high demand for adhesives that can be applied from solution. From environmental standpoints, the preference is for non-halogenated and aromatic-free solvents such as methyl ethyl ketone and ethyl acetate. The solution is prepared in general by dissolving the solid copolyester pellets in the desired solvent; the solids content is to be as high as possible for reasons of economics. The higher the solids content, the smaller the amount of solvent that has to be evaporated when the bond is produced. A further advantage lies in the transport and delivery of solid pellets rather than solutions.

Typical applications are the production of laminates from polymeric films and/or metallic foils for flexible packaging and printed electronic circuits, and also flexible ribbon cables and profile wrapping.

The solubility of amorphous copolyesters in non-halogenated solvents is relatively good. However, at a glass transition temperature (Tg) below 30° C., they can no longer be pelletized, and can be produced only as inconvenient plates or in block form. Since, moreover, they have surface tack, the plates must be provided during storage with release film, in order to prevent blocking. Before the solution is prepared, the release films must be removed, which is laborious. The amorphous low-Tg copolyesters have good adhesion properties and provide the adhesive with flexibility.

Crystalline copolyesters, despite having good pelletizing properties, are insoluble in non-halogenated solvents.

Information on the solubility of amorphous and crystalline copolyesters in typical halogenated and non-halogenated solvents is given in the brochure for Degussa GmbH's "DYNAPOL S Copolyesters" range.

JP 06184515 describes a saturated copolyester composed of succinic acid or adipic acid, terephthalic acid, isophthalic acid, 1,4-butanediol, 1,6-hexanediol, ethylene glycol and cyclohexanedimethanol. The copolyester is soluble only in mixtures with a high aromatic content, composed of 50 to 90% toluene and 10-50% ketones. In one example the enthalpy of fusion as measured by the DSC method is 14.3 J/g. The solids content of the copolyester in a mixture of 80% toluene and 20% methyl ethyl ketone is 20%.

JP 2003327676 describes a crystalline copolyester which can be obtained from adipic acid, terephthalic acid, hexahydroterephthalic acid, 1,4-butanediol, 1,6-hexanediol, cyclohexanedimethanol and trimellitic anhydride and which is soluble in mixtures of solvents such as methyl ethyl ketone, cyclohexanone, tetrahydrofuran and ethyl acetate with aromatic solvents, preferably toluene. In one embodiment the enthalpy of fusion is 9 J/g. The molecular weight is stated as 25 000. A solution having a solids content of 25% in a mixture of 80% toluene and 20% methyl ethyl ketone is stable.

It was an object of the present invention to develop a crystalline polyester of high molecular mass that can be dissolved with a solids content of 30%, at least, in non-halogenated and aromatic-free solvents, such as methyl ethyl ketone, ethyl acetate and tetrahydrofuran, for example, and that at the same time has a crystallinity that allows pelletizing. The solution ought to be stable on storage and ought not to gel within 24 hours. The copolyester ought, moreover, to exhibit effective adhesion to a variety of substrates, especially to plastics and metallic substrates.

Surprisingly it has been found that copolyesters of 20-50 mol %, preferably 30-45 mol % terephthalic acid, 20-50 mol %, preferably 25-40 mol % isophthalic acid and/or phthalic acid, 10-30 mol %, preferably 15-25 mol % linear aliphatic dicarboxylic acids having 9-20 carbon atoms, 1-20 mol %, preferably 5-15 mol % of dimer fatty acid, and one or more glycols are pelletizable and sufficiently crystalline and can be dissolved with a solids content of at least 30%, preferably 30 to 35%, by weight in non-halogenated and non-aromatic solvents; that is, a solution of 100% by weight solids and solvent contains at least 30%, preferably 30% to 35% by weight, of solids, i.e. copolyester. To set the desired solids content, the corresponding quantity of pellets are weighed out into a sealable glass bottle and made up with solvent to 100 parts by weight. The mixture is dissolved on a shaker or on a roller bed for 1 to 24 hours, preferably 1 to 15 hours, at 25 to 50° C., preferably at 35 to 50° C. The solution may also be prepared in a stirring vessel, for example.

A copolyester melt is pelletizable in the sense of the present invention if it can be converted by a variety of pelletizing methods known to the skilled person, such as strand pelletizing, prilling, granulating or crushing, for example, into a granular, pourable solid.

If desired it is also possible, rather than the free acids, to use their esterifiable derivatives, such as corresponding lower alkyl esters, for example.

In particular embodiments the aromatic dicarboxylic acids terephthalic acid, isophthalic acid and/or phthalic acid may be replaced by up to 5 mol %, preferably up to 2 mol %, of branched polycarboxylic acids.

The one or more glycols of the copolyesters of the invention are preferably selected from 90-100 mol %, preferably 92-99 mol %, of one or more linear aliphatic glycols and not more than up to 10 mol %, preferably 1-8 mol %, of one or more polyalkylene glycols.

In particular embodiments the linear aliphatic glycols may be replaced by up to 5 mol %, preferably up to 2 mol %, of branched polyols.

Suitable linear aliphatic dicarboxylic acids are, for example, azelaic acid, sebacic acid, undecanedioic acid, tetradecanedioic acid, dodecanedioic acid, octadecanedioic acid and mixtures thereof.

The term "dimer fatty acids" refers generally to technical mixtures which are prepared by oligomerizing unsaturated fatty acids. Through fractionation it is possible to separate off dimers. Starting materials used are unsaturated C-12 to C-22 fatty acids such as oleic acid or linoleic acid. The dimer fatty acids preferably contain a dimer fraction of at least 90%. As dimer fatty acid it is possible to employ commercial products from Uniqema with the trade name Pripol, from Oleon with the trade name Radiacid, from Arizona Chemical with the trade name Unidyme, from Cognis with the trade name Empol, and the like.

Examples of branched polycarboxylic acids are trimellitic anhydride and pyromellitic anhydride.

Examples of linear aliphatic glycols are, for example, 1,2-ethylene glycol, 1,2-propanediol, 1,3-propanediol, 1,4-butanediol, 1,5-pentanediol, 1,6-hexanediol, 1,9-nonanediol, 1,12-dodecanediol, 2,2'-dimethylpropylene glycol, 1,3-butylethylpropanediol, methylpropanediol, methylpentanediols and mixtures thereof.

Examples of branched polyols are trimethylolpropane, pentaerythritol and mixtures thereof.

Examples of polyalkylene glycols are polyethylene glycol, polypropylene glycol and polybutylene glycol and mixtures thereof. The polyalkylene glycols used ought to possess molar masses of between 400 and 2000 g/mol.

Examples of non-halogenated and aromatic-free solvents are methyl ethyl ketone, tetrahydrofuran, cyclohexanone, ethyl acetate, propyl acetate, butyl acetate and mixtures thereof, preference being given to methyl ethyl ketone and/or ethyl acetate.

Particularly preferred copolyesters of the present invention have the following composition: 38 to 43 mol % terephthalic acid, 25 to 30 mol % isophthalic acid, 20 to 25 mol % sebacic acid, 8 to 12 mol % dimer fatty acid, the sum of the polycarboxylic acids being 100 mol %, and also 80 to 90 mol % 1,4-butanediol, 10 to 20 mol % 1,6-hexanediol and not more than up to 5 mol % polymethylene glycol with a molecular weight of 1000 g/mol, the sum of the glycols being 100 mol %.

The crystalline copolyesters have in particular the following properties:
a molar mass ($M_w$) of 25 000 to 70 000 g/mol, preferably 40 000 to 60 000 g/mol,
a glass transition temperature (Tg) of 0° C. to −50° C., preferably −10° C. to −40° C.,
a melting temperature (Tm) of 30° C. to 110° C., preferably 40 to 90° C.,
and an enthalpy of fusion (ΔHm) of 1 to 20 J/g, preferably 3 to 15 J/g.

The molar mass Mw is the mass-average molar weight and is determined by means of gel permeation chromatography (GPC). Characterization takes place in tetrahydrofuran as eluent in accordance with DIN 55672-1. Unit is g/mol.

The glass transition temperature, melting temperature and enthalpy of fusion are determined by the DSC method of DIN 53675 (1st heating). The heating rate is 10° C./minute. In the case of the melting temperature, the highest peak is reported.

The copolyesters of the invention are prepared by means of established techniques for (poly)condensation reactions. They can be obtained, for example, by condensation of polyols and polycarboxylic acids or their esters, anhydrides or acid chlorides in an inert gas atmosphere at temperatures of 100 to 280° C., preferably of 150 to 270° C., within 3 to 30 hours, in the melt or azeotropically, as is described, for example, in Methoden der Organischen Chemie (Houben-Weyl), vol. 14/2, 1-5, 21-23, 40-44, Georg Thieme Verlag, Stuttgart, 1963, in C. R. Martens, Alkyd Resins, 51-59, Reinhold Plastics Appl. Series, Reinhold Publishing Comp., New York, 1961, or in DE 27 35 497 and 30 04 903. Typical catalysts are organotitanium or organotin compounds, such as tetrabutyl titanate or dibutyltin oxide, for example. Optionally the copolyesters can be provided without or with processing assistants or additives such as antioxidants or crystallization accelerants, for example.

The copolyesters of the invention have good adhesion values and are very suitable indeed for formulation and use in adhesives, especially for electronics applications such as for the production of ribbon cables or printed circuits, for example, and as adhesives in packaging and profile wrapping. A further field of application is their use as a sealant and also as an adhesion promoter.

Likewise provided by the present invention are adhesives comprising the copolyesters of the invention. The adhesives of the invention have the advantage that they are very flexible, exhibit low contraction and exhibit very high adhesion to a multiplicity of substrates such as wood, paper, leather, textiles, fibre composites, especially to plastics and metallic substrates, and more particularly to PET and copper.

In principle the adhesives in question may be any kind of adhesives that are known to the skilled person; more particularly they are solvent-borne adhesives, and especially adhesives in solution in methyl ethyl ketone and/or ethyl acetate.

The fraction of the copolyesters of the invention in the solvent-borne adhesive is 1 to 40 parts by weight, preferably 10 to 35 parts by weight and very preferably 30 to 35 parts by weight.

Besides the copolyesters of the invention, the adhesives may comprise further additives. Examples of useful additives include polymers such as amorphous copolyesters, for example, pigments and fillers such as talc, silicon dioxide, titanium dioxide, carbon black and/or coloured pigments, for example, flame retardants such as zinc borates, ammonium polyphosphates and/or antimony oxides, for example, crosslinkers such as polyisocyanates and/or blocked polyisocyanates, for example, and/or ageing inhibitors and auxiliaries.

The adhesives of the invention are especially suitable for use in the electronics sector, in the construction sector, in the automotive, packaging, wood, furniture, textile, graphics and footwear industries, and in window construction.

Even without further remarks it is assumed that a person skilled in the art will be able to utilize the above description in its widest extent. The preferred embodiments and examples are therefore to be interpreted merely as a descriptive disclosure which by no means limits the invention in any way whatsoever.

Below, the present invention is illustrated with reference to examples. Alternative embodiments of the present invention are obtainable by analogy.

EXAMPLES

General preparation instructions for the polyesters of the invention A 12 l stainless steel reactor is charged with 1.72 kg of dimethyl terephthalate (0.38 mol), 2.17 kg of 1,4-butanediol (1.03 mol), 0.64 kg of 1,6-hexanediol (0.23 mol), 0.60 kg of polybutylene glycol (0.03 mol) and 4 g of tetrabutyl titanate.

After the air has been displaced by nitrogen, the initial charge is heated under atmospheric pressure, the stirrer is switched on when the internal temperature is 120 to 130° C., and, up to a final temperature of 180° C., 0.72 l of distillate (essentially methanol) is removed with a column overhead temperature of 62 to 67° C. By bypassing the column, a further 0.15 l of distillate is obtained. Thereafter the batch is cooled to 160° C., 1.12 kg of isophthalic acid, 1.08 kg of sebacic acid (0.23 mol), 1.33 kg of dimer fatty acid (0.20 mol) and 8 g of talc are added against a vigorous stream of nitrogen, the temperature is set at 190° C. to 200° C., and 0.52 l of distillate (essentially water) is stripped off via the column. Thereafter the temperature is raised to 240° C. and at the same time vacuum is applied. Stirring takes place at 240° C. under a pressure of below $1.5 \cdot 10^{-3}$ bar. Subsequently, the vacuum is removed with nitrogen and the melt is discharged and pelletized.

Example 1

38 mol % terephthalic acid
29 mol % isophthalic acid
23 mol % sebacic acid
10 mol % dimer fatty acid
80 mol % 1,4-butanediol 18 mol % 1,6-hexanediol
2 mol % polybutylene glycol 1000
Analytical data: Mw 51700, Tg −35° C.; Tm 70° C.; ΔHm 9 J/g
Mw=molecular weight, GPC method (against polystyrene)
Tg=glass transition temperature, DSC method
Tm=melting temperature, DSC method
ΔHm=enthalpy of fusion, DSC method Example 2

38 mol % terephthalic acid
29 mol % isophthalic acid
23 mol % sebacic acid
10 mol % dimer fatty acid
80 mol % 1,4-butanediol
18 mol % 2,2'-dimethylpropylene glycol
2 mol % polybutylene glycol 1000
Analytical data: Mw 52000, Tg −30° C.; Tm 50° C.; ΔHm 3 J/g Example 3

38 mol % terephthalic acid
29 mol % isophthalic acid
23 mol % sebacic acid
10 mol % dimer fatty acid
80 mol % 1,4-butanediol
19 mol % 1,6-hexanediol
1 mol % polybutylene glycol 1000
Analytical data: Mw 52700, Tg −28° C.; Tm 72° C.; ΔHm 9 J/g Preparation of the comparative examples in the same way as for Example 1

Comparative Example C1

68 mol % terephthalic acid
32 mol % azelaic acid
50 mol % monoethylene glycol
50 mol % 2,2'-dimethylpropylene glycol
Analytical data: Mw 53200, Tg 12° C., no melt peak The copolyester is permanently tacky and non-pelletizable.

Comparative Example C2

50 mol % terephthalic acid
50 mol % adipic acid
100 mol % monoethylene glycol
Analytical data: Mw 47900, Tg 0° C.; Tm 120° C.; ΔHm 13 J/g Testing of Solubility To prepare the solutions, 6 g of copolyester and 14 g of solvent are weighed out into a sealable 30 ml glass bottle. The mixture is dissolved at 35° C. for 12 hours in an incubator with shaker insert. The solubility is assessed immediately after the solution has cooled to room temperature, and after the solution has been stored at room temperature, in accordance with the following features.

| Polyester | | 1 | 2 | 3 | C1 | C2 |
|---|---|---|---|---|---|---|
| Methyl ethyl ketone | immediate | ++ | ++ | ++ | ++ | −− |
| | 1 day | ++ | ++ | ++ | ++ | −− |
| | 1 week | ++ | ++ | ++ | ++ | −− |

-continued

| Polyester | | 1 | 2 | 3 | C1 | C2 |
|---|---|---|---|---|---|---|
| Ethyl acetate | immediate | ++ | ++ | ++ | ++ | −− |
| | 1 day | ++ | ++ | ++ | ++ | −− |
| | 1 week | ++ | ++ | ++ | ++ | −− |

C1 is non-pelletizable
Homogeneous solution = ++
Undissolved pellets = −−

Testing of Adhesion

Using a box-section coating bar, about 70 g/m² of a 30% strength copolyester solution in MEK (in dichloromethane in the case of Comparative Example C2) is applied to a substrate to be bonded. The solvent is allowed to evaporate at room temperature for 30 minutes and at 60° C. for a further 30 minutes. The application rate following removal of the solvent is about 20 g/m². When the coated substrate has cooled to room temperature, it is bonded to the second, uncoated substrate in a sealing apparatus within 30 seconds at a temperature of 120° C. and a pressure of 400 N.

After two days, strips 15 mm wide are cut from the bonded substrates, and their peel strength is determined at an angle of 90° using a tensile testing machine, as a measure of the adhesion. The figure reported is the maximum force Fmax in N.

| | Peel strength Fmax (N) | | | | |
|---|---|---|---|---|---|
| | Example | | | | |
| Substrate | 1 | 2 | 3 | C1 | C2 |
| PET/PET | 17 | 23 | 22 | 14 | 15 |
| PET/Cu | 12 | 11 | 11 | 14 | 6 |

Substrates used:
PET = Mylar film, 125 μm thick
Cu = copper foil, uncoated, 40 μm thick

The invention claimed is:

1. A crystalline pelletizable copolyester, comprising
   20 to 50 mol % of terephthalic acid,
   20 to 50 mol % of isophthalic acid and/or phthalic acid,
   10 to 30 mol % of a linear aliphatic dicarboxylic acid having 9 to 20 carbon atoms,
   1 to 20 mol % of dimer fatty acid, the sum of polycarboxylic acids being 100 mol %; and
   one or more glycols,
   which can be dissolved with a solids content of at least 30% by weight in non-halogenated and non-aromatic solvents,
   wherein said copolyester has a molar mass (Mw) of 25 000 to 70 000 g/mol.

2. The crystalline copolyester according to claim 1, wherein the one or more glycols are selected from 90 to 100 mol % of one or more linear aliphatic glycols and not more than 10 mol % of one or more polyalkylene glycols.

3. The crystalline copolyester according to claim 1, wherein the copolyester has the following properties:
   a glass transition temperature of 0° C. to −50° C.,
   a melting temperature of 30° C. to 110° C., and
   an enthalpy of fusion of 1 to 20 J/g.

4. The crystalline copolyester according to claim 1, wherein said aliphatic dicarboxylic acid is at least one acid selected from the group consisting of azelaic acid, sebacic acid, undecanedioic acid, dodecanedioic acid, tetradecanedioic acid, octadecanedioic acid and mixtures thereof.

5. The crystalline copolyester according to claim 2, wherein said linear aliphatic glycol is at least one glycol selected from the group consisting of 1,2-ethylene glycol, 1,2-propanediol, 1,3-propanediol, 1,4-butanediol, 1,5-pentanediol, 1,6-hexanediol, 1,9-nonanediol, 1,12-dodecanediol, 2,2'-dimethylpropylene glycol, 1,3-butylethylpropanediol, methylpropanediol, methylpentanediols and mixtures thereof.

6. The crystalline copolyester according to claim 2, wherein said polyalkylene glycol is at least one glycol selected from the group consisting of polyethylene glycol, polypropylene glycol, polybutylene glycol and mixtures thereof.

7. The crystalline copolyester according to claim 6, wherein the polyalkylene glycol possesses molar masses of between 400 and 2000 g/mol.

8. A sealant or adhesion promoter comprising a copolyester according to claim 1.

9. An adhesive comprising a copolyester according to claim 1.

10. The crystalline copolyester according to claim 1 comprising
    30 to 45 mol % of terephthalic acid,
    25 to 40 mol % of isophthalic acid and/or phthalic acid,
    15 to 25 mol % of a linear aliphatic dicarboxylic acid having 9 to 20 carbon atoms,
    5 to 15 mol % of dimer fatty acid, the sum of polycarboxylic acids being 100 mol %.

11. The crystalline copolyester according to claim 1, which can be dissolved with a solids content of 30 to 35% by weight in non-halogenated and non-aromatic solvents.

12. The crystalline copolyester according to claim 1, comprising
    38 to 43 mol % of terephthalic acid,
    25 to 30 mol % of isophthalic acid and/or phthalic acid,
    20 to 25 mol % of sebacic acid,
    8 to 12 mol % of dimer fatty acid, the sum of polycarboxylic acids being 100 mol %.

13. The crystalline copolyester according to claim 1, having a molar mass of 40,000 to 60,000 g/mol.

14. The crystalline copolyester according to claim 1, having a melting temperature of 40 to 90° C.

15. The crystalline copolyester according to claim 1, having an enthalpy of fusion of 3 to 15 J/g.

16. The crystalline copolyester according to claim 1, comprising
    80-90 mol % of 1,4-butanediol,
    10-20 mol % of 1,6-hexanediol and
    not more than 5 mol % of polymethyleneglycol with a molecular weight of 1,000 g/mol, the sum of glycols being 100 mol %.

17. The crystalline copolyester according to claim 1, wherein said halogenated and non-aromatic solvents are methyl ethyl ketone, tetrahydrofuran, cyclohexanone, ethyl acetate, propyl acetate, butyl acetate and a mixture thereof.

18. The crystalline copolyester according to claim 1, further comprising up to 5 mol % of a branched polycarboxylic acid.

* * * * *

UNITED STATES PATENT AND TRADEMARK OFFICE
CERTIFICATE OF CORRECTION

PATENT NO. : 8,163,843 B2  
APPLICATION NO. : 12/523069  
DATED : April 24, 2012  
INVENTOR(S) : Gabriele Brenner et al.

Page 1 of 1

It is certified that error appears in the above-identified patent and that said Letters Patent is hereby corrected as shown below:

On the title page, Item (54), and column 1, the title is incorrect. Item (54) and column 1, should read:

--CRYSTALLINE COPOLYESTERS HAVING HIGH SOLUBILITY IN NON-HALOGENATED SOLVENTS, AND THEIR USE--

On the title page, Item (86), the Application Filing Date is incorrect. Item (86) should read:

--(86) PCT No.: PCT/EP2008/050119  
§371 (c)(1),  
(2), (4) Date: Jul. 14, 2009--

Signed and Sealed this  
Nineteenth Day of June, 2012

David J. Kappos  
*Director of the United States Patent and Trademark Office*